United States Patent
Conroy et al.

(10) Patent No.: US 8,726,055 B2
(45) Date of Patent: *May 13, 2014

(54) MULTI-CORE POWER MANAGEMENT

(75) Inventors: David G. Conroy, El Granada, CA (US); Guy Sotomayor, San Jose, CA (US)

(73) Assignee: Apple Inc., Cupertino, CA (US)

( * ) Notice: Subject to any disclaimer, the term of this patent is extended or adjusted under 35 U.S.C. 154(b) by 346 days.

This patent is subject to a terminal disclaimer.

(21) Appl. No.: 12/886,431

(22) Filed: Sep. 20, 2010

(65) Prior Publication Data

US 2012/0072749 A1 Mar. 22, 2012

(51) Int. Cl.
*G06F 1/32* (2006.01)

(52) U.S. Cl.
CPC .............. *G06F 1/324* (2013.01); *G06F 1/3206* (2013.01); *G06F 1/32* (2013.01); *G06F 1/3203* (2013.01); *G06F 1/3228* (2013.01); *G06F 1/3234* (2013.01); *G06F 1/3243* (2013.01); *G06F 1/3246* (2013.01); *G06F 1/3287* (2013.01)
USPC ........... 713/322; 713/300; 713/310; 713/320; 713/321; 713/323; 713/324

(58) Field of Classification Search
CPC ....... G06F 1/32; G06F 1/3203; G06F 1/3228; G06F 1/3234; G06F 1/3243; G06F 1/3246; G06F 1/3287; G06F 1/324; G06F 1/3206
See application file for complete search history.

(56) References Cited

U.S. PATENT DOCUMENTS

| | | | |
|---|---|---|---|
| 6,269,043 B1 | 7/2001 | Batcher | |
| 6,748,546 B1 | 6/2004 | Mirov | |
| 7,392,414 B2 | 6/2008 | Bailey | |
| 2004/0221187 A1* | 11/2004 | Durand et al. | 713/300 |
| 2008/0005592 A1* | 1/2008 | Allarey et al. | 713/300 |
| 2008/0162980 A1 | 7/2008 | Dahan | |
| 2010/0268974 A1* | 10/2010 | Floyd et al. | 713/340 |
| 2012/0072746 A1* | 3/2012 | Sotomayor | 713/320 |
| 2012/0072749 A1* | 3/2012 | Conroy et al. | 713/322 |

* cited by examiner

*Primary Examiner* — Tanh Nguyen
(74) *Attorney, Agent, or Firm* — Park, Vaughan, Fleming & Dowler LLP

(57) ABSTRACT

The disclosed embodiments provide a system that operates a processor in a multi-core processor system. During operation, the system detects the creation of an asynchronous wakeup event for the processor. In response to detecting the creation of the asynchronous wakeup event, when the processor is subsequently placed into an idle state, the system configures the processor to resume operation at a reduced frequency that is a fraction of an operating frequency for the multi-core processor system, wherein the reduced frequency allows more power to be allocated to other processors in the multi-core processor system.

13 Claims, 5 Drawing Sheets

MULTI-CORE POWER MANAGEMENT

BACKGROUND

1. Field

The disclosed embodiments relate to power-management techniques for multi-core processor systems. More specifically, the disclosed embodiments relate to power-management techniques that facilitates high-frequency operation of processor cores in a multi-core processor system.

2. Related Art

Modern computer systems typically utilize multiple processors and/or processor cores to increase computational performance. Processors in a multiprocessor system may additionally be configured to run at various speeds through a power management system that feeds different operating voltages and/or frequencies into the processors. For example, a four-core processor system with two idle cores may temporarily overclock the two non-idle cores by allocating power normally used to operate the idle cores to the non-idle cores.

However, the high-frequency execution of non-idle cores in a multi-core processor system may be limited by the subsequent asynchronous execution of the idle cores. For example, a timer queue for an idle core may include an asynchronous wakeup event that causes the core to resume operation at a pre-specified time in the future. If the core resumes operation during high-frequency operation of other cores in the multi-core processor system, the additional power required to resume execution of the core at high frequency may overload the power supply for the multi-core processor system, and in turn, cause the multi-core processor system to fail. To prevent such failure, overclocking of non-idle cores may be avoided whenever idle cores are associated with impending wakeup events.

Hence, what is needed is a mechanism for facilitating high-frequency operation of non-idle cores in conjunction with asynchronous timing events for idle cores in a multi-core processor system.

SUMMARY

The disclosed embodiments provide a system that operates a processor in a multi-core processor system. During operation, the system detects the creation of a wakeup event for the processor. In response to detecting the creation of the wakeup event, when the processor is subsequently placed into an idle state, the system configures the processor to resume operation at a reduced frequency that is a fraction of an operating frequency for the multi-core processor system, wherein the reduced frequency allows more power to be allocated to other processors in the multi-core processor system.

In some embodiments, when the wakeup event occurs, the system also resumes operation of the processor at the reduced frequency to service the wakeup event.

In some embodiments, resuming operation of the processor to service the wakeup event involves determining a workload associated with servicing the wakeup event. If the workload exceeds a threshold, the system negotiates with the multi-core processor system to allocate more power to the processor. Upon allocating more power to the processor, the system executes the processor at the operating frequency of the multi-core processor system instead of the reduced frequency to service the wakeup event.

In some embodiments, upon placing the processor into the idle state, the system also allocates power to the other processors to increase the operating frequency of the multi-core processor system from a first frequency to a second frequency.

In some embodiments, a power supply for the multi-core processor system is capable of supplying power to all processors in the multi-core processor system executing at the first frequency, and the power supply is not capable of supplying power to all processors in the multi-core processor system executing at the second frequency.

In some embodiments, the first frequency corresponds to an underclocked state of the multi-core processor system.

In some embodiments, the second frequency corresponds to an overclocked state of the multi-core processor system.

In some embodiments, the reduced frequency is associated with a throttling state of the multi-core processor system.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Figure 1:
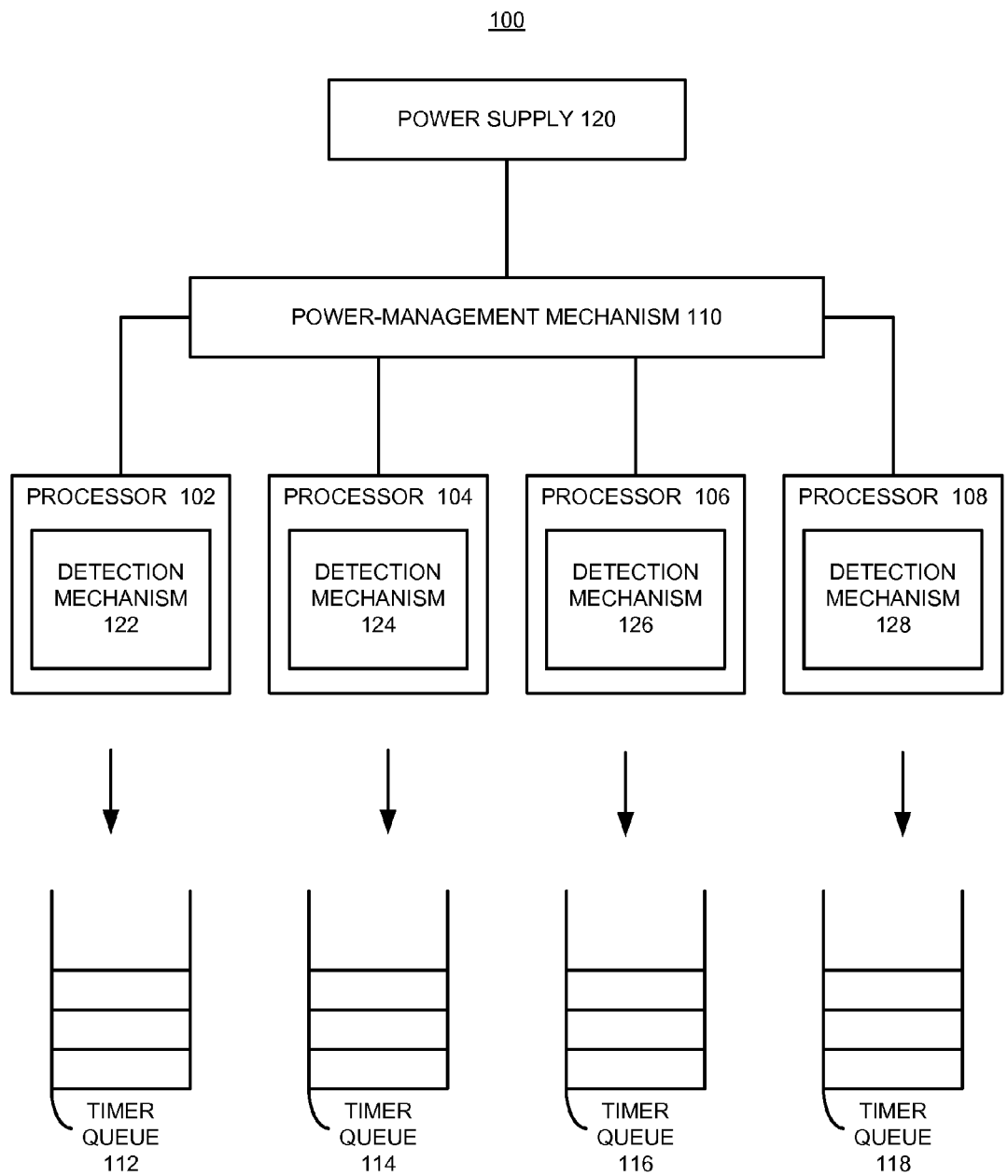
FIG. 1 shows a multi-core processor system in accordance with the disclosed embodiments.

Embodiments provide a method and system for operating one or more processors in a multi-core processor system. As shown in FIG. 1, the multi-core processor system 100 includes a set of processors 102-108. Multi-core processor system 100 may increase computational performance in a computer system such as a personal computer, laptop computer, workstation, server computer, and/or portable electronic device. For example, processors 102-108 may be used to concurrently execute computer programs on the computer system, including applications, libraries, databases, operating systems, and/or device drivers. Note that the multiple processors 102-108 (e.g., processor cores) in multi-core processor 100 may be integrated into a single semiconductor chip. Alternatively, the processors 102-108 in multi-core processor system 100 may be physically separated from one another and may reside in different processor chips.

In one or more embodiments, a power-management mechanism 110 facilitates the operation of processors 102-108 by allocating power to processors 102-108 from a power supply 120. The performance of processors 102-108 can be increased and/or decreased by power-management mechanism 110 in order to change the amount of power consumed by processors 102-108. For example, power-management mechanism 110 may temporarily boost performance in (e.g., overclock) one or more processors 102-108 by increasing the power allocated to the processor(s). Conversely, power-management mechanism 110 may lower the operating frequency of (e.g., underclock) one or more processors 102-108 to reduce the amount of power dissipated by the processor(s).

Those skilled in the art will appreciate that the operation of processors 102-108 may be affected by the capacity of power supply 120. In one embodiment, power supply 120 may not supply enough power to run processors 102-108 at the specified operating frequency of multi-core processor system 100. For example, an underrated power supply may be connected to processors 102-108 to increase the electrical efficiency of multi-core processor system 100 and/or save space in the computer system. In this example, power-management mechanism 110 must lower the operating frequency of (underclock) processors 102-108 to reduce the amount of power dissipated by processors 102-108 so that the allocation of the capacity of power supply 120 is acceptable.

In another embodiment, power supply 120 may support operation of all processors 102-108 at the specified operating frequency of multi-core processor system 100 but may not supply enough power for high-frequency operation (e.g., overclocking) of all processors 102-108 at the same time. Power-management mechanism 110 may thus enable high-frequency operation of multi-core processor system 100 only if one or more processors are placed into an idle state. For example, the operating frequency of processors 106-108 may be temporarily increased from 1 GHz to 2 GHz if processors 102-104 are idle. In other words, power normally allocated to the idle processors 102-104 may enable the temporary operation of the non-idle processors 106-108 above the specified operating frequency of multi-core processor system 100.

However, a processor in an idle state may subsequently resume operation if a timer queue 112-118 for the processor includes an asynchronous wakeup event. For example, a wakeup event in timer queue 112 may cause processor 102 to resume operation 0.5 seconds in the future to service the wakeup event. Furthermore, power-management mechanism 110 may be unable to supply different operating frequencies and/or voltages into different processors at the same time. As a result, an idle processor may be required to resume operation at the same frequency and/or voltage as the operating frequency and/or voltage of the non-idle processors in multi-core processor system 100.

Consequently, the high-frequency operation of processors 102-108 may be limited by wakeup events that trigger the subsequent operation of idle processors in multi-core processor system 100. In particular, the asynchronous, resumed operation of idle processors at overclocked frequencies may overload power supply 120 and cause the computer system to fail. To avoid such failure, power-management mechanism 110 may boost the operating frequency of multi-core processor system 100 only if timer queues for idle processors are empty. Moreover, such preclusion of high-frequency operation during certain idle states of processors 102-108 may negatively impact the computational performance of multi-core processor system 100.

In one or more embodiments, multi-core processor system 100 enables high-frequency operation of non-idle processors even when idle processors are associated with asynchronous wakeup events. More specifically, a detection mechanism 122-128 associated with each processor 102-108 may detect the creation of a wakeup event in the timer queue 112-118 for the processor. The wakeup event may indicate that the processor is to be placed into an idle state and is to be scheduled to resume operation at a pre-specified point in the future.

Next, power-management mechanism 110 may configure the processor to resume operation at a reduced frequency that is a fraction of the operating frequency for multi-core processor system 100. Such configuration of the processor may be made prior to placing the processor into an idle state. For example, the reduced frequency may be selected by the processor and/or power-management mechanism 110 immediately before the processor enters the idle state.

In one or more embodiments, the reduced frequency is associated with a throttling state of multi-core processor system 100. For example, power-management mechanism 110 may reduce the frequency of the processor to $1/16$ of the operating frequency of multi-core processor system 100 by conditionally enabling $1/16$ of the clock signals for the processor. Such throttling will reduce the dynamic power consumption of the processor, thus allowing more power to be allocated to other processors in multi-core processor system 100.

More specifically, the reduction in frequency of the processor may reduce the processor's dynamic power consumption by the same proportion. For example, the operation of the processor at $1/16$ duty cycle may reduce the processor's dynamic power consumption by $15/16$. In turn, $15/16$ of the dynamic power normally dissipated by the processor may be used in the high-frequency execution of the other processors during the processor's idle state. At the same time, $1/16$ of the processor's dynamic power and the processor's leakage power may be allocated to the processor to allow the processor to resume operation and service the wakeup event without overloading power supply 120. As a result, dynamic power from the idle processor may be allocated to the other processors based on the processor's leakage power.

Once the processor resumes operation, the processor's execution may be based on a workload associated with servicing the wakeup event. If the workload exceeds a threshold, the processor may negotiate with the other processors and/or power-management mechanism 110 to allocate more power to the processor. Upon allocating more power to the processor, the processor may execute at the operating frequency of multi-core processor system 100 instead of the reduced frequency. For example, the processor and other non-idle processors may execute at the highest frequency supported by power supply 120 and/or at the specified operating frequency of multi-core processor system 100.

If the workload does not exceed the threshold, the processor may continue servicing the wakeup event at the reduced frequency until the workload is completed. For example, the processor may continue executing at $1/16$ of the operating frequency of multi-core processor system 100 if servicing the wakeup event requires only the scheduling of an interrupt thread and deletion of the wakeup event from the timer queue.

The overall performance of multi-core processor system 100 may thus be increased by temporarily reducing the computational performance of processors associated with asynchronous wakeup events. For example, the throttling of a processor with a wakeup event may allow non-idle processors to safely execute at frequencies higher than those normally supported by power supply 120 during the processor's idle periods. At the same time, the performance impact associated with the processor's resumed operation at the reduced frequency may be mitigated by assessing the workload of the processor and reallocating power among processors 102-108 accordingly.

Figure 2:
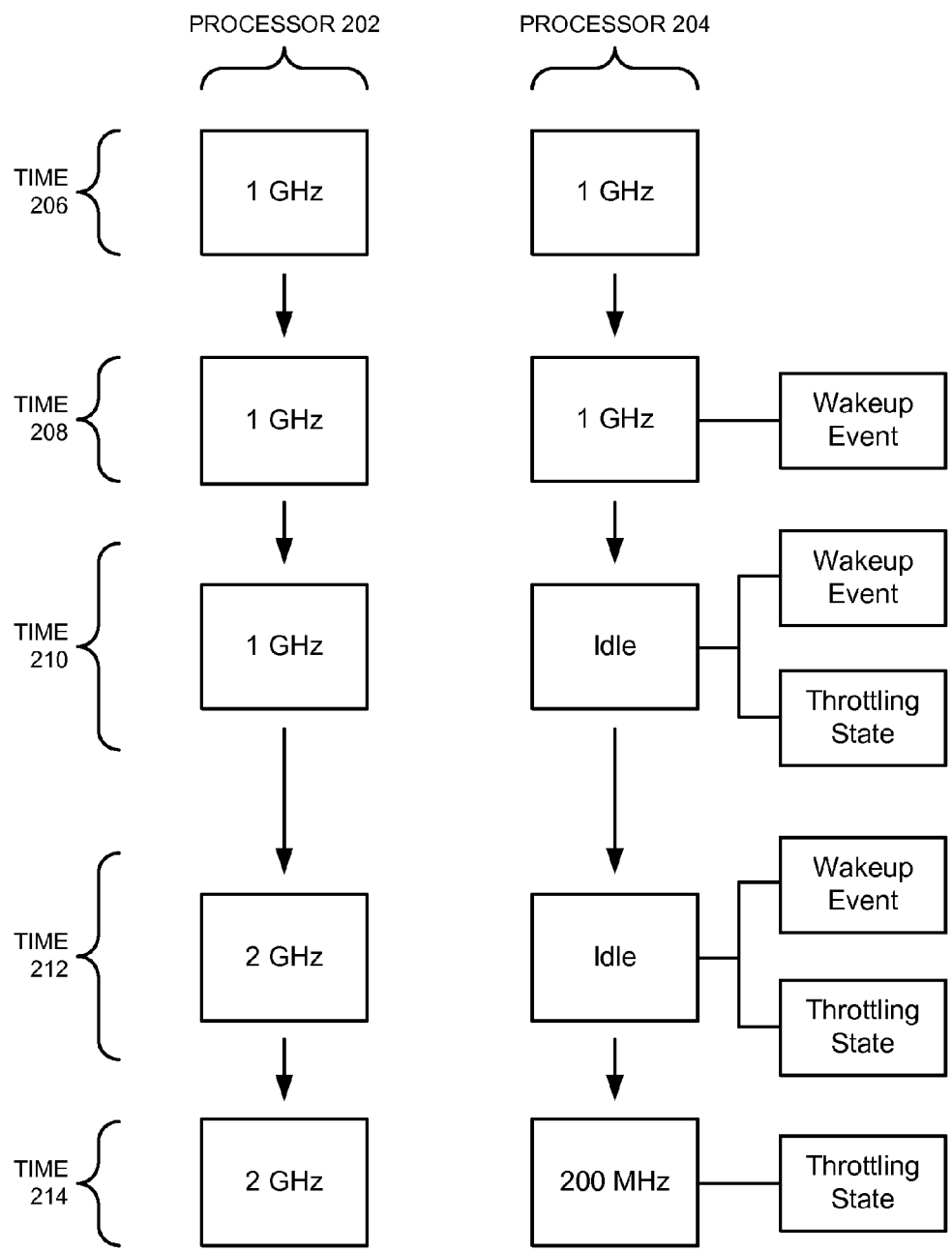
FIG. 2 shows the exemplary operation of processors in a multi-core processor system in accordance with the disclosed embodiments.

FIG. 2 shows the exemplary operation of processors in a multi-core processor system (e.g., multi-core processor system 100 of FIG. 1) in accordance with the disclosed embodiments. More specifically, FIG. 2 shows the operating frequencies of two processors 202-204 over a series of times 206-214. Beginning with time 206, both processors 202-204 may initially execute at the operating frequency of the multi-core processor system, or 1 GHz.

Next, at time 208, an asynchronous wakeup event may be added to the timer queue for processor 204. As mentioned above, the wakeup event may indicate that processor 204 is to enter an idle state and subsequently resume operation at a pre-specified point in the future. Processor 204 may then be placed into a throttling state at or before time 210 to facilitate high-frequency operation of processor 202 during the idle state of processor 204. The throttling state may reduce the frequency of processor 204 to a fraction of the operating frequency of the multi-core processor system.

After processor 204 is throttled and idled, processor 202 may execute at 2 GHz at time 212. In other words, power normally dissipated by processor 204 may be allocated to processor 202 to increase the operating frequency of the multi-core processor system from a first frequency (e.g., 1 GHz) to a second frequency (e.g., 2 GHz). Moreover, a power supply for the multi-core processor system may be capable of supplying power to processors 202-204 executing at the first frequency, but may not be capable of supplying power to processors 202-204 executing at the second frequency.

For example, the first frequency may correspond to an underclocked state of the multi-core processor system if the power supply is underrated for the multi-core processor system. As a result, the second frequency may correspond to a frequency that is at or near the specified operating frequency of the multi-core processor system. On the other hand, the power supply may sufficiently power both processors 202-204 at the specified operating frequency of the multi-core processor system, and thus the second frequency may correspond to an overclocked state of the multi-core processor system.

Finally, at time 214, the wakeup event may cause processor 204 to resume operation. At the same time, the throttling state may cause processor 204 to execute at 200 MHz, or $1/10$ the operating frequency of the multi-core processor system. Because the throttling state correspondingly reduces the dynamic power of processor 204 to $1/10$ of the dynamic power of processor 202, overloading of the power supply may be avoided and both processors may safely continue executing.

Moreover, subsequent execution of processors 202-204 may be based on the workload of processor 204 in servicing the wakeup event. If the workload is relatively light (e.g., remains below a threshold), processor 204 may continue operating at 200 MHz to service the wakeup event before returning to an idle state. Conversely, if the workload is larger (e.g., exceeds the threshold), processor 204 may negotiate with processor 202 and/or a power-management mechanism (e.g., power-management mechanism 110 of FIG. 1) for the multi-core processor system to allocate more power to processor 204. Once more power is allocated to processor 204, processor 204 may execute at the same frequency as processor 202 to service the wakeup event. For example, both processors 202-204 may revert to executing at 1 GHz until one processor idles and more power may be allocated to the other processor.

Figure 3:
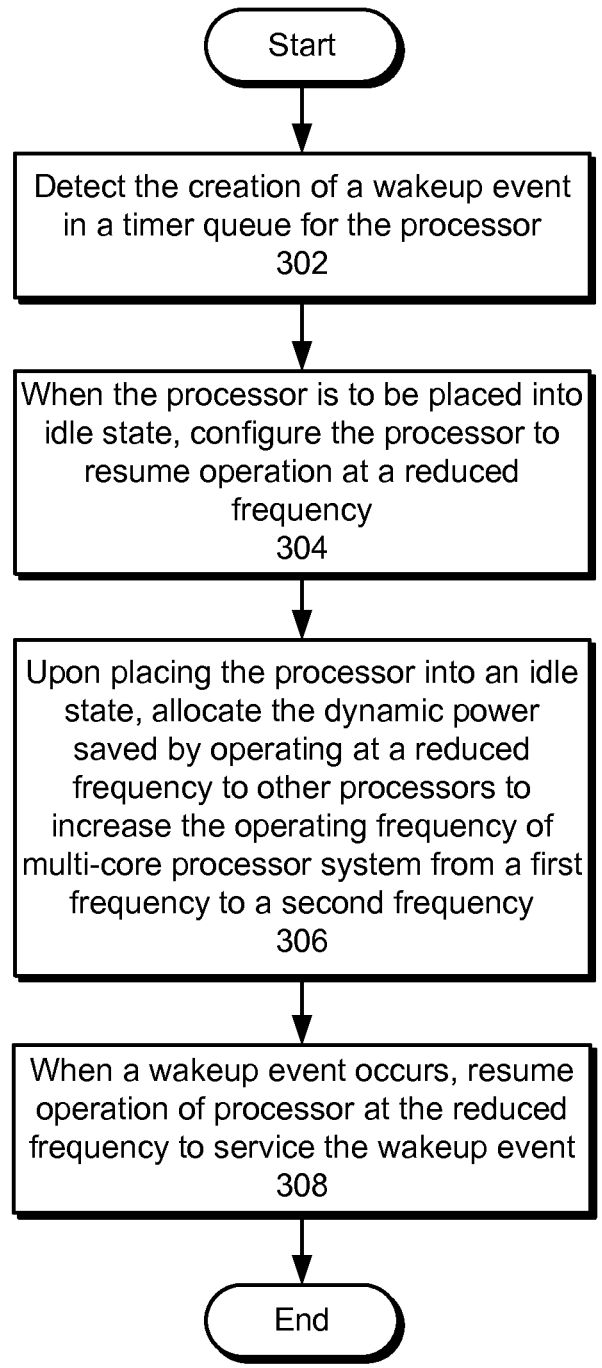
FIG. 3 shows a flowchart illustrating the process of operating a processor in a multi-core processor system in accordance with the disclosed embodiments.

FIG. 3 shows a flowchart illustrating the process of operating a processor in a multi-core processor system in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, the creation of a wakeup event is detected in a timer queue for the processor (operation 302). The wakeup event may indicate that the processor is to enter an idle state and is scheduled to asynchronously resume operation at a pre-specified point in the future. When the processor is to be placed into the idle state, the processor is configured to resume operation at a reduced frequency (operation 304). The reduced frequency may be a fraction of the operating frequency of the multi-core processor system. For example, the reduced frequency may be associated with a throttling state that divides the operating frequency of the multi-core processor system by a whole number.

Upon placing the processor into the idle state, the dynamic power saved by operating at a reduced frequency is allocated to other processors to increase the operating frequency of the multi-core processor system from a first frequency to a second frequency (operation 306). For example, the throttling state may reduce both the frequency and the dynamic power of the processor to $1/16$ of the frequency and dynamic power of other processors in the multi-core processor system. As a result, the remaining $15/16$ of the processor's dynamic power may be allocated to the other processors, thus allowing the multi-core processor system to execute at a higher operating frequency while the processor is idle and/or throttled.

Finally, when the wakeup event occurs, operation of the processor is resumed at the reduced frequency to service the wakeup event (operation 308). The reduced frequency may prevent the processor from overloading the power supply for the multi-core processor system while allowing the other processors to continue executing at the higher operating frequency. Resumed operation of the processor to service the wakeup event is discussed in further detail below with respect to FIG. 4.

Figure 4:
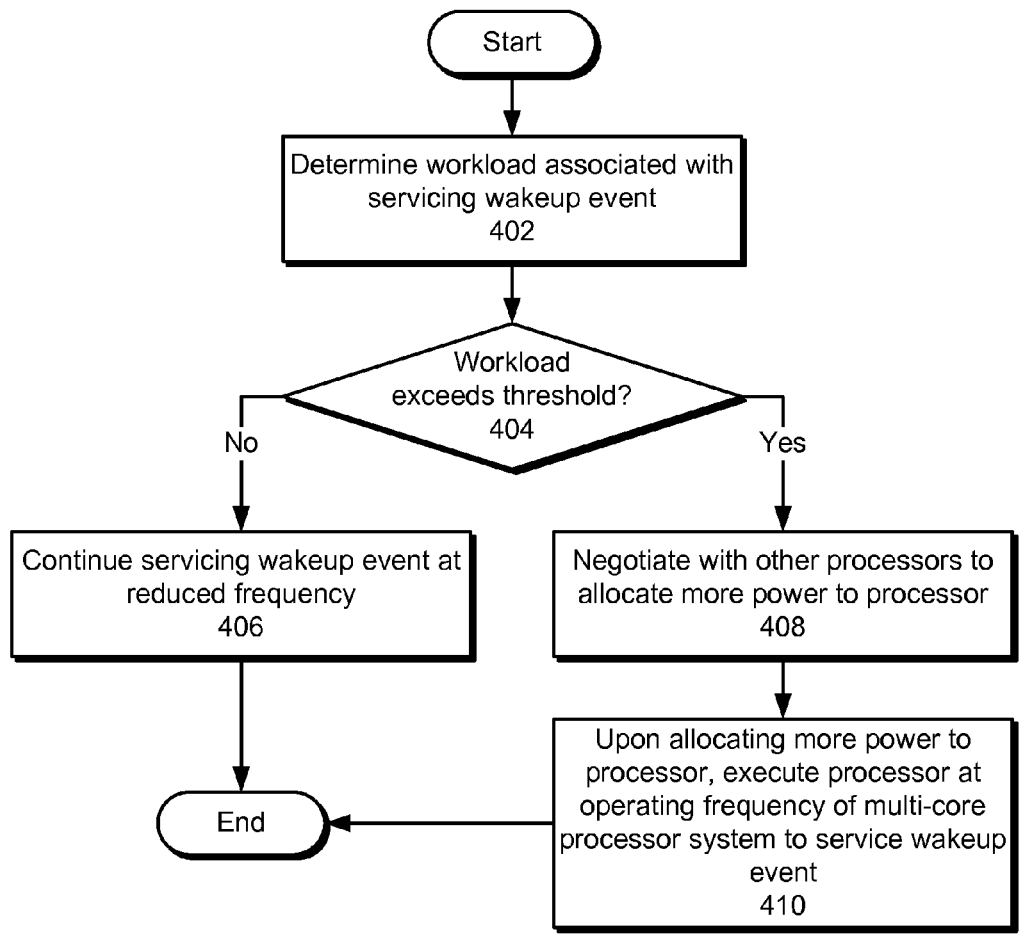
FIG. 4 shows a flowchart illustrating the process of resuming operation of a processor in a multi-core processor system to service a wakeup event in accordance with the disclosed embodiments.

FIG. 4 shows a flowchart illustrating the process of resuming operation of a processor in a multi-core processor system to service a wakeup event in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a workload associated with servicing the wakeup event is determined (operation 402). Next, the workload may be compared with a threshold (operation 404). If the workload does not exceed the threshold, the wakeup event may continue to be serviced at the reduced frequency (operation 406). For example, the processor may continue executing at 1/16 of the operating frequency of the multi-core processor system if the workload involves scheduling an interrupt thread and deleting the wakeup event from the timer queue for the processor.

However, if the workload exceeds the threshold, the processor may negotiate with the multi-core processor system to allocate more power to the processor (operation 408). For example, the processor may request more power from the other processors in the multi-core processor system and/or from a power-management mechanism in the multi-core processor system. Upon allocating more power to the processor, the processor is executed at the operating frequency of the multi-core processor system to service the wakeup event (operation 410). In other words, the operating frequency of the multi-core processor system may be adjusted to allow all processors to execute at the same frequency without overloading the power supply for the multi-core processor system.

Figure 5:
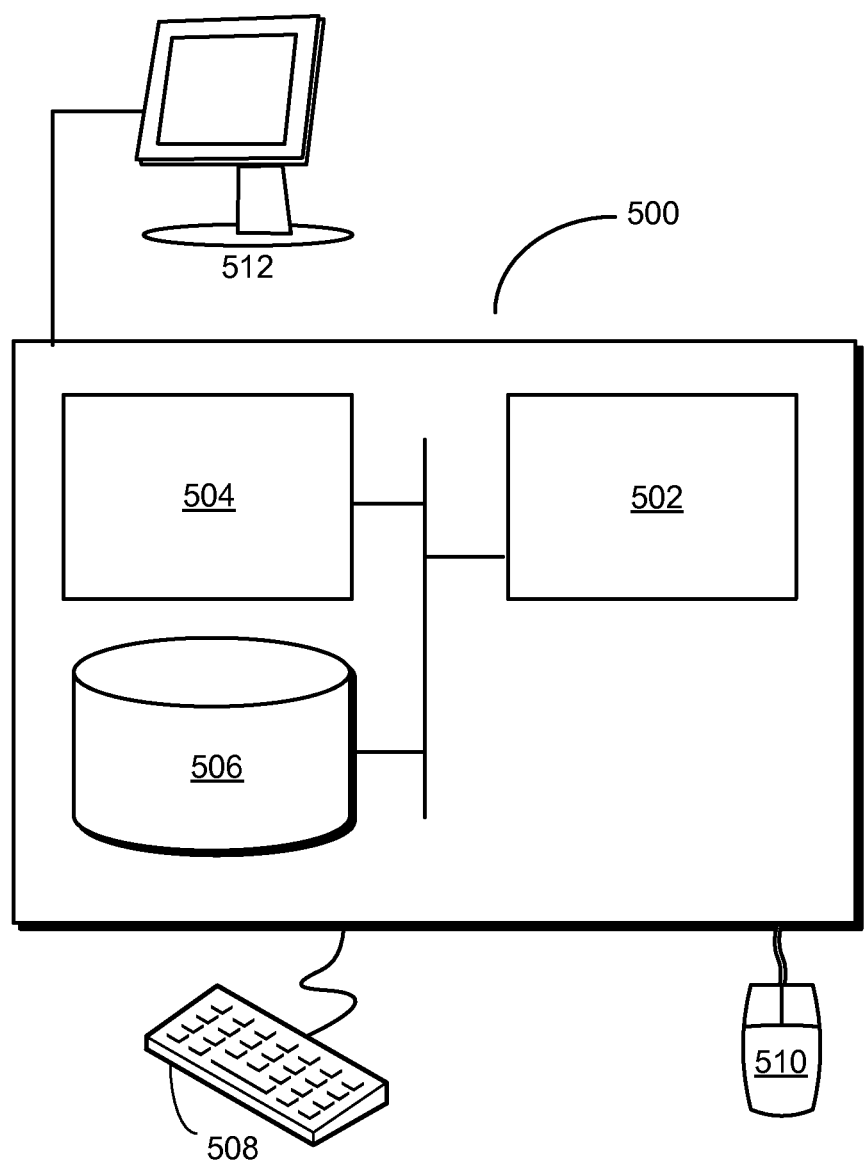
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for operating a processor (e.g., processor 502) in a multi-core processor system. The system may include a detection mechanism that detects the creation of a wakeup event in a timer queue for the processor. The system may also include a power-management mechanism that configures the processor to resume operation at a reduced frequency that is a fraction of the operating frequency for the multi-core processing system to allow more power to be allocated to other processors in the multi-core processor system. In particular, the power-management mechanism may configure the processor to execute at the reduced frequency if the wakeup event has been detected and prior to placing the processor into an idle state. Finally, the system may include an execution mechanism (e.g., within the processor) that resumes operation of the processor at the reduced frequency to service the wakeup event when the wakeup event occurs.

In addition, one or more components of computer system 500 may be remotely located and connected to the other components over a network. Portions of the present embodiments (e.g., detection mechanism, power-management mechanism, execution mechanism, etc.) may also be located on different nodes of a distributed system that implements the embodiments. For example, the present embodiments may be implemented using a cloud computing system that facilitates the operation of a multi-core processor system in a computer system.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for operating a processor in a multi-core processor system, comprising:

detecting a creation of an asynchronous wakeup event in a timer queue for the processor, the asynchronous wakeup event indicating that the processor is to be placed into an idle state and is to resume operation at a specified time in the future;

in response to detecting the creation of the asynchronous wakeup event, when the processor is to be placed into an idle state, configuring the processor to resume operation at a reduced frequency that is a fraction of an operating frequency for the multi-core processor system, upon placing the processor into the idle state, increasing a frequency of one or more other processors in the multi-core processor system from a first frequency to a second frequency;

when the asynchronous wakeup event occurs, resuming operation of the processor at the reduced frequency to service the asynchronous wakeup event;

determining a workload associated with servicing the asynchronous wakeup event;

if the workload exceeds a threshold, configuring the processor to operate at the operating frequency of the multi-core processor system, wherein said configuration comprises:

negotiating with the multi-core processor system to allocate more power to the processor;

decreasing the frequency of the one or more other processors from the second frequency to the first frequency; and increasing the frequency of the processor from the reduced frequency to the first frequency; and if the workload does not exceed the threshold, allowing the processor to continue servicing the asynchronous wakeup event at the reduced frequency.

2. The method of claim 1, wherein a power supply for the multi-core processor system is capable of supplying power to all processors in the multi-core processor system executing at the first frequency, and wherein the power supply is not capable of supplying power to all processors in the multi-core processor system executing at the second frequency.

3. The method of claim 1, wherein the first frequency corresponds to an underclocked state of the multi-core processor system.

4. The method of claim 1, wherein the second frequency corresponds to an overclocked state of the multi-core processor system.

5. The method of claim 1, wherein the reduced frequency is associated with a throttling state of the multi-core processor system.

6. A system for operating a processor in a multi-core processor system, comprising:
a detection mechanism configured to detect a creation of an asynchronous wakeup event in a timer queue for the processor, the asynchronous wakeup event indicating that the processor is to be placed into an idle state and is to resume operation at a specified time in the future;
a power-management mechanism configured to:
prior to placing the processor into the idle state, if the creation of the asynchronous wakeup event has been detected, configure the processor to resume operation at a reduced frequency that is a fraction of an operating frequency for the multi-core processor system, and
upon placing the processor into the idle state, increase a frequency of one or more other processors in the multi-core processor system from a first frequency to a second frequency; and
an execution mechanism configured to:
resume operation of the processor at the reduced frequency to service the asynchronous wakeup event when the asynchronous wakeup event occurs;
determine a workload associated with servicing the asynchronous wakeup event;
if the workload exceeds a threshold, configure the processor to operate at the operating frequency of the multi-core processor system, wherein said configuration comprises:
negotiating with the multi-core processor system to allocate more power to the processor;
decreasing the frequency of the one or more other processors from the second frequency to the first frequency; and
increasing the frequency of the processor from the reduced frequency to the first frequency; and
if the workload does not exceed the threshold, allow the processor to continue servicing the asynchronous wakeup event at the reduced frequency.

7. The system of claim 6,
wherein a power supply for the multi-core processor system is capable of supplying power to all processors in the multi-core processor system executing at the first frequency, and
wherein the power supply is not capable of supplying power to all processors in the multi-core processor system executing at the second frequency.

8. The system of claim 6, wherein the power-management mechanism uses a throttling state of the multi-core processor system to configure the processor to resume operation at the reduced frequency.

9. A non-transitory computer-readable storage medium storing instructions that when executed by a computer cause the computer to perform a method for operating a processor in a multi-core processor system, comprising:
detecting a creation of an asynchronous wakeup event in a timer queue for the processor, the asynchronous wakeup event indicating that the processor is to be placed into an idle state and is to resume operation at a specified time in the future; and
in response to detecting the creation of the asynchronous wakeup event, when the processor is to be placed into an idle state, configuring the processor to resume operation at a reduced frequency that is a fraction of an operating frequency for the multi-core processor system,
upon placing the processor into the idle state, increasing a frequency of one or more other processors in the multi-core processor system from a first frequency to a second frequency;
when the asynchronous wakeup event occurs, resuming operation of the processor at the reduced frequency to service the asynchronous wakeup event;
determining a workload associated with servicing the asynchronous wakeup event;
if the workload exceeds a threshold, configuring the processor to operate at the operating frequency of the multi-core processor system, wherein said configuration comprises:
negotiating with the multi-core processor system to allocate more power to the processor;
decreasing the frequency of the one or more other processors from the second frequency to the first frequency; and
increasing the frequency of the processor from the reduced frequency to the first frequency; and
if the workload does not exceed the threshold, allowing the processor to continue servicing the asynchronous wakeup event at the reduced frequency.

10. The non-transitory computer-readable storage medium of claim 9, wherein the first frequency corresponds to an underclocked state of the multi-core processor system.

11. The non-transitory computer-readable storage medium of claim 9, wherein the second frequency corresponds to an overclocked state of the multi-core processor system.

12. The non-transitory computer-readable storage medium of claim 9, wherein the reduced frequency is associated with a throttling state of the multi-core processor system.

13. A computer system, comprising:
a multi-core processor system;
a power supply for the multi-core processor system;
a detection mechanism configured to detect a creation of an asynchronous wakeup event in a timer queue for a processor in the multi-core processor system, the asynchronous wakeup event indicating that the processor is to be placed into an idle state and is to resume operation at a specified time in the future;
a power-management mechanism configured to:
prior to placing the processor into an idle state, if the creation of the asynchronous wakeup event has been detected, configure the processor to resume operation at a reduced frequency that is a fraction of an operating frequency for the multi-core processor system; and
upon placing the processor into the idle state, increasing a frequency of one or more other processors in the multi-core processor system from a first frequency to a second frequency; and
an execution mechanism configured to:
resume operation of the processor at the reduced frequency to service the asynchronous wakeup event when the asynchronous wakeup event occurs;
determine a workload associated with servicing the asynchronous wakeup event;
if the workload exceeds a threshold, configure the processor to operate at the operating frequency of the multi-core processor system, wherein said configuration comprises:
negotiating with the multi-core processor system to allocate more power to the processor;
decreasing the frequency of the one or more other processors from the second frequency to the first frequency; and increasing the frequency of the processor from the reduced frequency to the first frequency; and if the workload does not exceed the threshold, allow the processor to continue servicing the asynchronous wakeup event at the reduced frequency.

* * * * *